United States Patent
Muramatsu et al.

(10) Patent No.: US 7,781,110 B2
(45) Date of Patent: Aug. 24, 2010

(54) FUEL CELL SYSTEM AND TRANSPORT EQUIPMENT INCLUDING THE SAME

(75) Inventors: Yasuyuki Muramatsu, Shizuoka (JP); Shuhei Adachi, Shizuoka (JP); Masatsugu Oishi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1327 days.

(21) Appl. No.: 11/179,974

(22) Filed: Jul. 12, 2005

(65) Prior Publication Data

US 2006/0019143 A1    Jan. 26, 2006

(30) Foreign Application Priority Data

Jul. 20, 2004    (JP) ............... 2004-211639

(51) Int. Cl.
*H01M 8/04*    (2006.01)
(52) U.S. Cl. .................... 429/408; 429/415
(58) Field of Classification Search .............. None
See application file for complete search history.

(56) References Cited

U.S. PATENT DOCUMENTS

| | | | |
|---|---|---|---|
| 3,907,528 A * | 9/1975 | Halter | 96/385 |
| 3,982,962 A * | 9/1976 | Bloomfield | 429/19 |
| 5,672,439 A * | 9/1997 | Wilkinson et al. | 429/40 |
| 5,780,179 A * | 7/1998 | Okamoto | 429/20 |
| 6,007,307 A * | 12/1999 | Sonoda | 417/312 |
| 6,124,054 A * | 9/2000 | Gorman et al. | 429/34 |
| 2002/0025465 A1* | 2/2002 | Christen et al. | 429/24 |
| 2002/0172853 A1* | 11/2002 | Kamo et al. | 429/34 |
| 2002/0187374 A1 | 12/2002 | Yamauchi et al. | |
| 2002/0192513 A1* | 12/2002 | Colbow et al. | 429/13 |
| 2003/0095872 A1* | 5/2003 | McNamee et al. | 417/65 |
| 2004/0265655 A1* | 12/2004 | Kozu et al. | 429/13 |

FOREIGN PATENT DOCUMENTS

| | | |
|---|---|---|
| JP | 2004-079210 | 3/2004 |
| WO | 02/17424 A1 | 2/2002 |

OTHER PUBLICATIONS

European Search Report issued in corresponding European Patent Application No. 05015484.8-2119, dated Jun. 12, 2006.
Official communication issued in counterpart Chinese Application No. 2005100842000, mailed on Aug. 8, 2008.

* cited by examiner

*Primary Examiner*—Dah-Wei D Yuan
*Assistant Examiner*—Adam A Arciero
(74) *Attorney, Agent, or Firm*—Keating & Bennett, LLP (57) ABSTRACT

A fuel cell system that is capable of handling gasified fuel in an aqueous solution tank includes an aqueous solution tank which holds fuel aqueous solution, a fuel cell including an anode supplied with the fuel aqueous solution from the aqueous solution tank, and a cathode provided with a catalyst containing platinum Pt, an air supplying unit including an air pump and arranged to supply air to the cathode in the fuel cell, and a gas guide arranged to add a gas containing gasified methanol from the aqueous solution tank to the air to be sent to the cathode.

20 Claims, 8 Drawing Sheets

FUEL CELL SYSTEM AND TRANSPORT EQUIPMENT INCLUDING THE SAME

BACKGROUND OF THE INVENTION

1. Field of the Invention

The present invention relates to a fuel cell system and transport equipment including the same, and more specifically, the present invention relates to a fuel cell system which returns unused fuel aqueous solution from a fuel cell to an aqueous solution tank, and also relates to transport equipment such as a motorcycle which utilizes the novel fuel cell system.

2. Description of the Related Art

JP-A 2004-79210 (hereinafter referred to as "Patent Document 1") discloses a technique for removing byproducts, ionic byproducts or metal ions from a liquid produced in a fuel cell system.

Although the technique disclosed in Patent Document 1 enables collection of hazardous substances occurring in a fuel cell stack, this technique leaves the following problems unaddressed.

Specifically, fuel cells utilized in office equipment such as a personal computer typically operate in a temperature range of from room temperature to 40° C. Therefore, when carbon dioxide is discharged from the aqueous solution tank, not much methanol as the fuel is gasified and discharged simultaneously. However, in a direct methanol fuel cell which operates at a temperature not lower than 50° C., and more specifically at a relatively high temperature of around 65° C., a greater amount of methanol is gasified and discharged from the aqueous solution tank together with carbon dioxide. This is undesirable from an environmental viewpoint.

The problem of discharging methanol into the outside environment cannot be solved by applying the technique in Patent Document 1 to the direct methanol fuel cell system, because Patent Document 1 makes no reference to the problem of how to deal with the methanol gas in the aqueous solution tank.

SUMMARY OF THE INVENTION

In order to overcome the problems described above, preferred embodiments of the present invention provide a fuel cell system capable of handling gasified fuel in the aqueous solution tank, and transport equipment including such a novel fuel cell system.

According to a preferred embodiment of the present invention, a fuel cell system includes an aqueous solution tank which holds fuel aqueous solution, a fuel cell including an anode supplied with the fuel aqueous solution from the aqueous solution tank, and a cathode provided with a catalyst, an air supplying unit including an air pump for supplying air to the cathode in the fuel cell, and a gas guide arranged to add a gas containing gasified fuel from the aqueous solution tank to the air to be sent to the cathode.

According to the present preferred embodiment of the present invention, fuel which is already gasified in the aqueous solution tank is added to air to be sent by the air supplying unit to the cathode in the fuel cell. Together with air, the fuel is then sent to the cathode in the fuel cell by the air pump. At the cathode, with the help of a catalyst such as platinum, the fuel reacts with oxygen contained in the air and decomposed into water and carbon dioxide. As described above, the present invention facilitates the conversion of fuel into non-hazardous substances before it is discharged, without the need for additional processing steps or devices for treating the fuel. The present invention provides a simple method and apparatus for treating the gasified fuel which is present in the aqueous solution tank.

Preferably, the gas guide includes a tubular member for guiding the gas to a suction side of the air pump of the air supplying unit. When the gasified fuel which is present in the aqueous solution tank is guided to the suction side of the air pump of the air supplying unit, it becomes possible, without any pressure adjusting means, to guide the fuel to the cathode in the fuel cell by the suction from the air pump, without allowing the fuel to leak out. While the air pump is not operating, there is no power generation and there is little gas occurring in the aqueous solution tank. Therefore, no problems develop while the air pump is not in operation.

Further preferably, the air supplying unit includes an air filter provided at an end of the suction side, and an air chamber provided between the air filter and the air pump and connected with the tubular member. In this case, as the air pump operates, the pressure inside the air chamber becomes lower than the atmospheric pressure due to the air filter. On the other hand, internal pressure in the aqueous solution tank during power generation is higher than the atmospheric pressure. Therefore, when gasified fuel in the aqueous solution tank is guided to the air chamber, it becomes possible to guide the fuel to the cathode in the fuel cell without causing fuel leak to outside, even if there is no pressure adjusting means provided.

Further, preferably, the gas guide includes a tubular member for guiding the gas to a discharge side of the air pump of the air supplying unit. In this case, the fuel which is detrimental to the pump mechanism is supplied to the discharge side (downstream side) of the air pump, so there is no possible damage to the air pump.

Preferably, the gas guide further includes a check valve connected with the tubular member which is provided on the discharge side of the air pump, for preventing the gas from flowing back. If air pressure on the discharge side of the air pump is greater than the pressure in the aqueous solution tank, air can flow back into the aqueous solution tank. However, by guiding the gas which contains the fuel from the aqueous solution tank to the discharge side of the air pump via a check valve, backflow of the air toward the aqueous solution tank is prevented.

Further preferably, the air supplying unit includes a pipe which connects the air pump with the cathode of the fuel cell. The pipe is provided with a throttled portion for reduced cross section of a passage for the gas, and the gas guide adds the gas to the air at the throttled portion. In this case, the air mixes with the gas which contains gasified fuel at the throttled portion which is provided between the air pump discharge side and the cathode of the fuel cell. Since the gas velocity increases at the throttled portion and there is a relative decrease in the pressure, the gas which contains fuel is easily mixed in the air.

Further, preferably, the gas guide includes a tubular member for guiding the gas to a space in the air pump. The space has a pressure lower than a pressure in the aqueous solution tank. By guiding the gasified fuel to a portion of the air pump where the pressure is lower than in the aqueous solution tank, the fuel is easily supplied to the cathode in the fuel cell without flowing back.

The amount of fuel evaporation is large in the fuel cell which operates at relatively high temperatures not lower than about 50° C. Therefore, the present invention can be suitably utilized in fuel cell systems in which the fuel cell operates at temperatures not lower than about 50° C.

Also, preferred embodiments of the present invention are suitably utilized in direct methanol fuel cell systems.

Further, preferred embodiments of the present invention are suitably utilized in transport equipment such as two-wheeled vehicles.

The above-described and other features, elements, steps, characteristics, aspects and advantages of the present invention will become clearer from the following detailed description of preferred embodiments to be made with reference to the attached drawings.

DETAILED DESCRIPTION OF PREFERRED EMBODIMENTS

Hereinafter, preferred embodiments of the present invention will be described with reference to the drawings.

Referring now to FIG. 1 through FIG. 4, a fuel cell system 10 according to a preferred embodiment of the present invention is preferably a direct methanol fuel cell system. Direct methanol fuel cell systems do not require a reformer, and therefore are used suitably in equipment in which portability is essential and/or smallness in size is desired.

Figure 2:
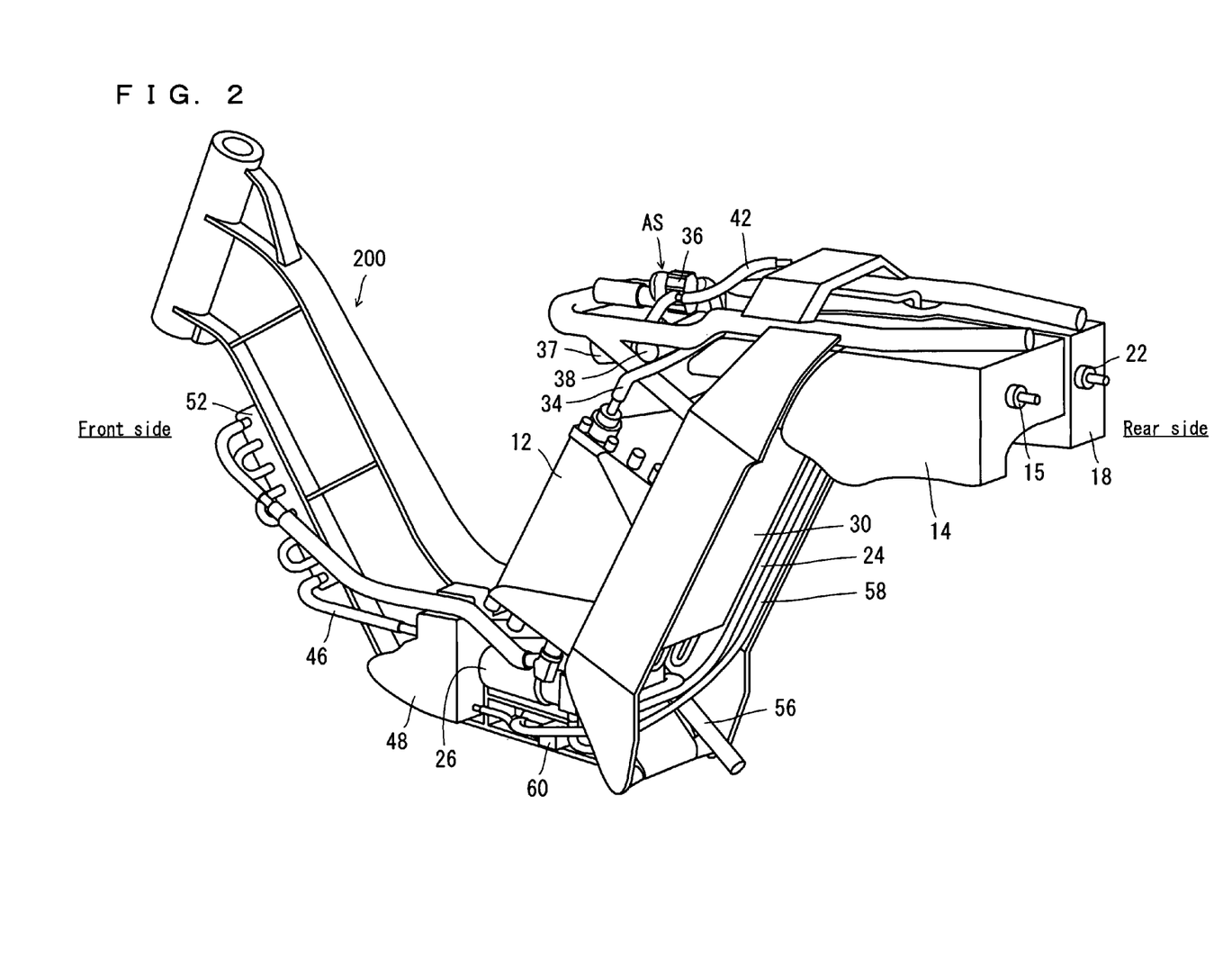
FIG. 2 is a perspective view of the fuel cell system as mounted on a motorcycle frame.
Figure 3:
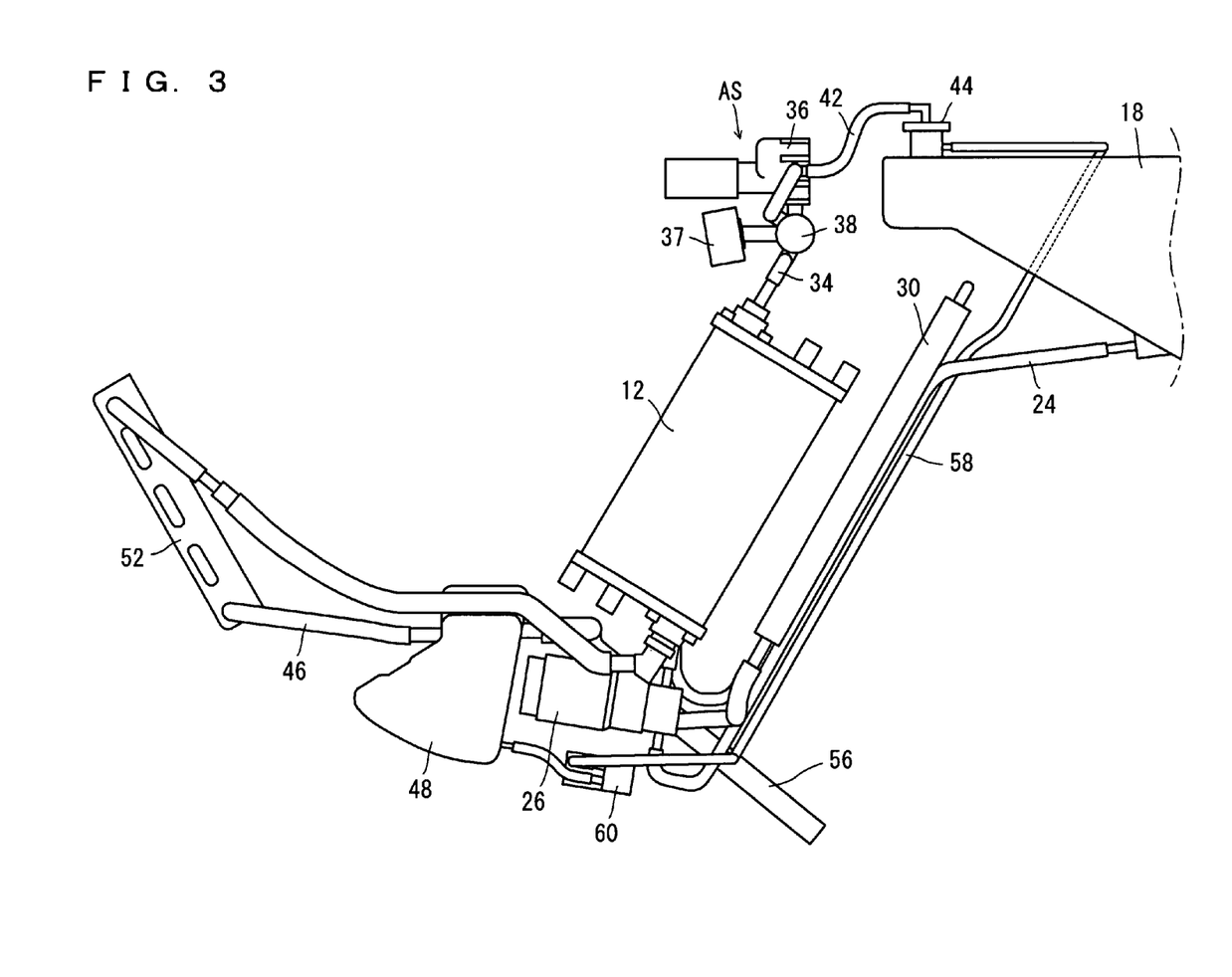
FIG. 3 is a schematic diagram of a primary portion of the fuel cell system which is mounted on the motorcycle frame.

Here, description will be made for a case in which the fuel cell system 10 is used in a motorcycle as an example of transport equipment. However, the present invention is in no way limited to a motorcycle and can be applied to any of a variety of transport equipment. As shown in FIG. 2, the motorcycle will be represented only by a vehicle frame 200. In FIG. 2, the left-hand side is the front side of the motorcycle, and the right-hand side is the rear side thereof. The fuel cell system 10 is disposed along the vehicle frame 200.

Figure 1:
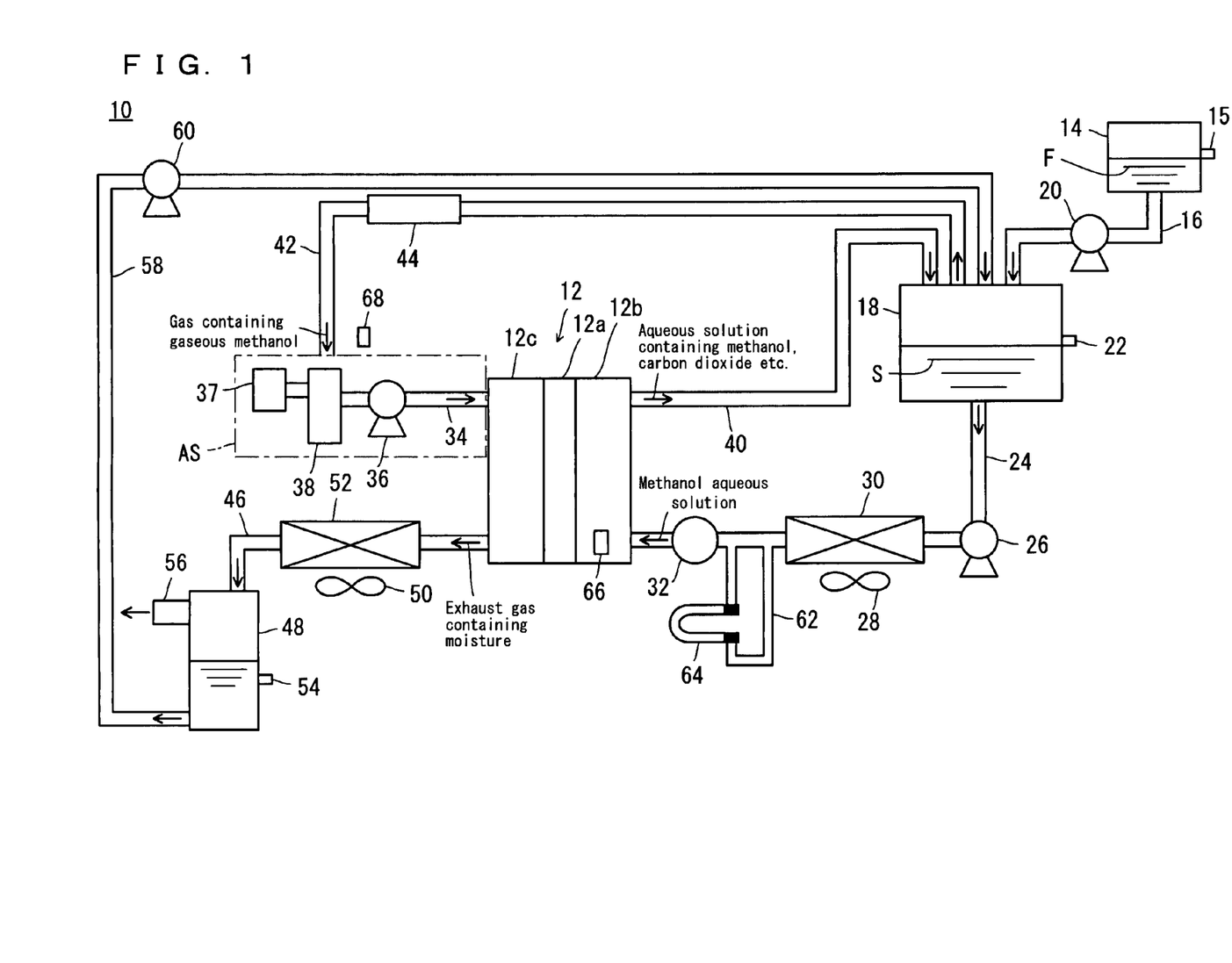
FIG. 1 is a schematic diagram of a primary portion of a fuel cell system according to a preferred embodiment of the present invention.

The fuel cell system 10 includes a fuel cell 12. The fuel cell 12 is preferably constructed as a fuel cell stack or a plurality of direct methanol fuel cells connected (laminated) in series, each of which includes an electrolyte 12a, and a pair of an anode (fuel electrode) 12b and a cathode (air electrode) 12c which sandwich the electrolyte 12a.

Figure 5:
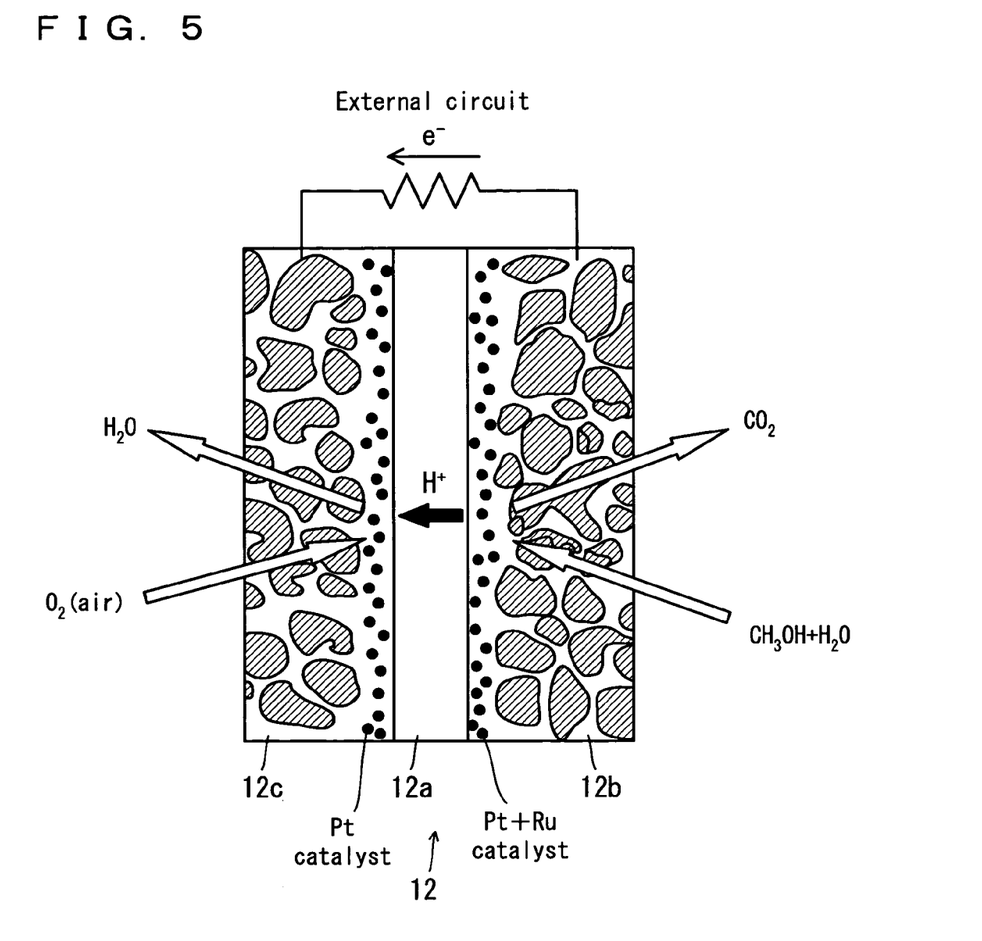
FIG. 5 is a schematic diagram showing an example of a fuel cell.

As shown in FIG. 5, the anode 12b in the fuel cell 12 contains a catalyst preferably in the form platinum (Pt) and Ruthenium (Ru) whereas the cathode 12c contains a catalyst preferably in the form of platinum (Pt). The anode 12b and the cathode 12c provide fields for a chemical reaction expressed by Chemical Formula 1:

Reaction at Anode:  (Chemical Formula 1)

Reaction at Cathode:

In the process of the above-described chemical reaction at the anode 12b, surfaces of the platinum at the anode 12b adsorb carbon monoxide (CO). The ruthenium then serves as an efficient supplier of oxygen atoms to the carbon monoxide, to produce carbon dioxide ($CO_2$). The carbon dioxide leaves the platinum surface, allowing the reaction to continue at the anode 12b. The Pt catalyst or the Ru catalyst for accelerated oxidization of the fuel may be replaced by other catalysts such as, Titanium (Ti), Rhodium (Rh), or other suitable material.

The fuel cell system 10 further includes a fuel tank 14 which holds highly concentrated methanol fuel (aqueous solution containing approximately 50 wt % of methanol as a fuel) F. The fuel tank 14 is connected, via a fuel supply pipe 16, with an aqueous solution tank 18 which stores methanol aqueous solution S as a fuel aqueous solution. The fuel supply pipe 16 is provided with a fuel pump 20. The fuel pump 20 supplies the aqueous solution tank 18 with the methanol fuel F from the fuel tank 14.

The fuel tank 14 is provided with a fluid level sensor 15 for detecting the level of methanol fuel F in the fuel tank 14. The aqueous solution tank 18 is provided with a fluid level sensor 22 for detecting the level of methanol aqueous solution S in the aqueous solution tank 18. The aqueous solution tank 18 is connected, via an aqueous solution pipe 24, with the anode 12b of the fuel cell 12. The aqueous solution pipe 24 is provided with an aqueous solution pump 26, a heat exchanger 30 equipped with a cooling fan 28, and an aqueous solution filter 32, respectively, arranged in this order from the upstream side. The methanol aqueous solution S in the aqueous solution tank 18 is pumped by the aqueous solution pump 26 toward the anode 12b, cooled by the heat exchanger 30 as necessary, and then purified by the aqueous solution filter 32 before being supplied to the anode 12b.

On the other hand, the cathode 12c in the fuel cell 12 is connected with air supplying unit AS. The air supplying unit AS preferably includes an air-intake pipe 34, an air pump 36 which pumps oxygen-containing air from outside and sends the air to the cathode 12c in the fuel cell 12, an air filter 37 which purifies the air introduced from the outside by the air pump 36, and an air chamber 38 which reduces noise from the air pump 36. The air-intake pipe 34 connects the cathode 12c in the fuel cell 12 with the air pump 36. Thus, as the air pump 36 operates, air which contains oxygen is cleaned by the air filter 37, and then supplied to the cathode 12c via the air chamber 38, the air pump 36, and the air-intake pipe 34.

The anode 12b is connected with the aqueous solution tank 18 via a pipe 40, through which the aqueous solution tank 18 is supplied with discharge from the anode 12b which includes an aqueous solution containing unused methanol, carbon dioxide as a byproduct, gasified methanol, etc.

Further, the aqueous solution tank 18 and the air supplying unit AS are connected with each other via a pipe 42. The pipe 42 is provided with a methanol trap 44 for separating methanol aqueous solution S. With this arrangement, carbon dioxide and gaseous methanol discharged from the aqueous solution tank 18 are supplied to the air supplying unit AS. A gas guide preferably includes the pipe 42.

Further, the cathode 12c is connected with a water tank 48 via a pipe 46. The pipe 46 is provided with a gas-liquid separator 52 equipped with a cooling fan 50. Exhaust gas which is discharged from the cathode 12c and contains moisture (water and water vapor) is supplied to the water tank 48 via the pipe 46.

The water tank 48 is provided with a fluid level sensor 54, which is provided by a float sensor, for example, for detection of the level of water in the water tank 48. The water tank 48 is provided with an exhaust gas pipe 56.

The water tank 48 is connected with the aqueous solution tank 18 via a water recycling pipe 58. The water recycling pipe 58 is provided with a water pump 60. Water in the water tank 48 is returned as necessary by the water pump 60 to the aqueous solution tank 18 depending on conditions in the aqueous solution tank 18.

In the route of the aqueous solution pipe 24, a bypass pipe 62 is formed between the heat exchanger 30 and the aqueous solution filter 32.

Figure 4:
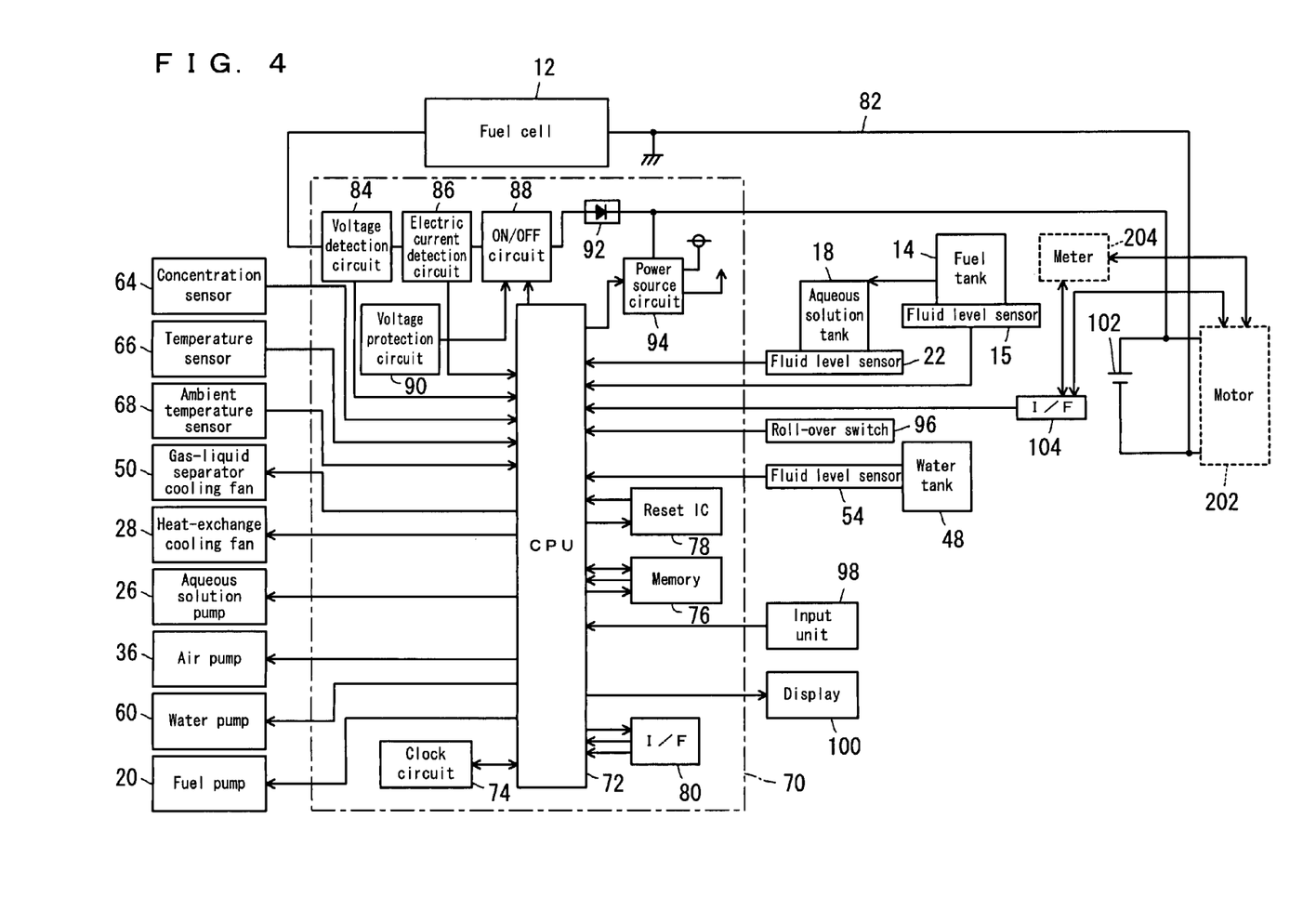
FIG. 4 is a block diagram which shows an electric configuration of the fuel cell system.

Referring now to FIG. 4 as well, the bypass pipe 62 is provided with a concentration sensor 64 for detecting the concentration of methanol aqueous solution S. A temperature sensor 66 for detecting the temperature of the fuel cell 12 is attached to the fuel cell 12, and an ambient temperature sensor 68 for detecting the ambient temperature is provided near the air supplying unit AS.

As shown in FIG. 4, the fuel cell system 10 preferably includes a control circuit 70.

The control circuit 70 preferably includes a CPU 72 which performs necessary calculations and controls operations of the fuel cell system 10, a clock circuit 74 which provides a clock to the CPU 72, a memory 76 including, e.g. an EEPROM, which stores programs and data necessary for controlling the fuel cell system 10 as well as calculation data, etc., a reset IC 78 which prevents malfunction of the fuel cell system 10, an interface circuit 80 for connections with external devices, a voltage detection circuit 84 which detects voltages in an electric circuit 82 to which the fuel cell 12 is connected to power a motor 202 to drive the motorcycle, an electric current detection circuit 86 which detects electric currents flowing in the electric circuit 82, an ON/OFF circuit 88 which opens and closes the electric circuit 82, a voltage protection circuit 90 which prevents over voltage in the electric circuit 82, a diode 92 provided in the electric circuit 82, and a power source circuit 94 which supplies a predetermined voltage to the electric circuit 82.

In the control circuit 70 as described above, the CPU 72 is supplied with detection signals from the concentration sensor 64, the temperature sensor 66 and the ambient temperature sensor 68, as well as detection signals from a roll-over switch 96 which detects whether or not the vehicle has rolled over, signals from an input unit 98 which serves for making various settings and information entry. Further, the CPU 72 is supplied with detection signals from the fluid level sensors 15, 22 and 54.

The CPU 72 controls various components such as the fuel pump 20, the aqueous solution pump 26, the air pump 36, the heat-exchanger cooling fan 28, the gas-liquid separator cooling fan 50 and the water pump 60. The CPU 72 also controls a display 100 which displays various information to notify the motorcycle rider.

The fuel cell 12 has a parallel connection with a secondary battery 102. The secondary battery 102 also has a parallel connection with the motor 202. The secondary battery 102 supplements the output from the fuel cell 12, is charged with electric energy from the fuel cell 12, and discharges to provide the motor 202 and other components with electric energy.

The motor 202 is provided with a meter 204 which makes measurements for various data concerning the motor 202. These data and status information about the motor 202 measured by the meter 204 are supplied to the CPU 72 via the interface circuit 104.

An operation of the fuel cell system 10 during power generation will be described.

When power generation is started, highly concentrated methanol aqueous solution S which is stored in the aqueous solution tank 18 is pumped by the aqueous solution pump 26 toward the fuel cell 12. The solution is cooled as necessary by the heat exchanger 30, purified by the aqueous solution filter 32, and then supplied to the anode 12b. On the other hand, air which contains oxygen is pumped by the air pump 36 toward the fuel cell 12, to the cathode 12c.

On the anode 12b in the fuel cell 12, methanol and water in the methanol aqueous solution S react electro-chemically with each other to produce carbon dioxide and hydrogen ions. The hydrogen ions move through the electrolyte 12a to the cathode 12c, where the hydrogen ions react electro-chemically with oxygen in the air which is supplied to the cathode 12c, to produce water and electric energy.

Carbon dioxide which occurred on the anode 12b in the fuel cell 12 flows through the pipe 40, the aqueous solution tank 18, the pipe 42, etc., then is supplied to the cathode 12c in the fuel cell 12 by the air supplying unit AS, and then it is discharged from the exhaust gas pipe 56 via the pipe 46, the gas-liquid separator 52 and water tank 48.

A reason why the carbon dioxide is discharged out of the aqueous solution tank 18 is to avoid increasing the pressure in the aqueous solution tank 18. Otherwise, the carbon dioxide will dissolve into the methanol aqueous solution S, and interfere with the chemical reaction according to the above-noted Chemical Formula 1 on the anode side.

On the other hand, most of the water vapor occurring on the cathode 12c in the fuel cell 12 is liquefied and discharged in the form of water, with saturated water vapor being discharged in the form of gas. A portion of the water vapor which was discharged from the cathode 12c is liquefied by lowering the dew point in the gas-liquid separator 52. Moisture (water and water vapor) and unused air discharged from the cathode 12c are supplied to the water tank 48 via the pipe 46. Also, water which has moved to the cathode 12c due to the water crossover is discharged from the cathode 12c and supplied to the water tank 48. Further, the crossover methanol and gasified methanol from the aqueous solution tank 18 react with oxygen in the air at the cathode 12c, are thus decomposed into water and carbon dioxide, and then discharged from the cathode 12c and supplied to the water tank 48.

The exhaust gas, which includes moisture (water and water vapor) from the cathode 12c, is pumped by the air pump 36 into the water tank 48.

Water which has collected in the water tank 48 is pumped by the water pump 60 and returned via the water recycling pipe 58 to the aqueous solution tank 18 as appropriately, where it is reused as water for methanol aqueous solution S. The exhaust gas introduced into the water tank 48 is discharged to the outside from the exhaust gas pipe 56.

Water vapor liquefying operation by the gas-liquid separator 52 is achieved by operating the cooling fan 50 and thereby lowering the dew point. This operation may be controlled based on an output from the fluid level sensor 54 provided in the water tank 48. Such an arrangement enables to reduce power consumption by the cooling fan 50.

Next, the air supplying unit AS will be described.

Figure 6:
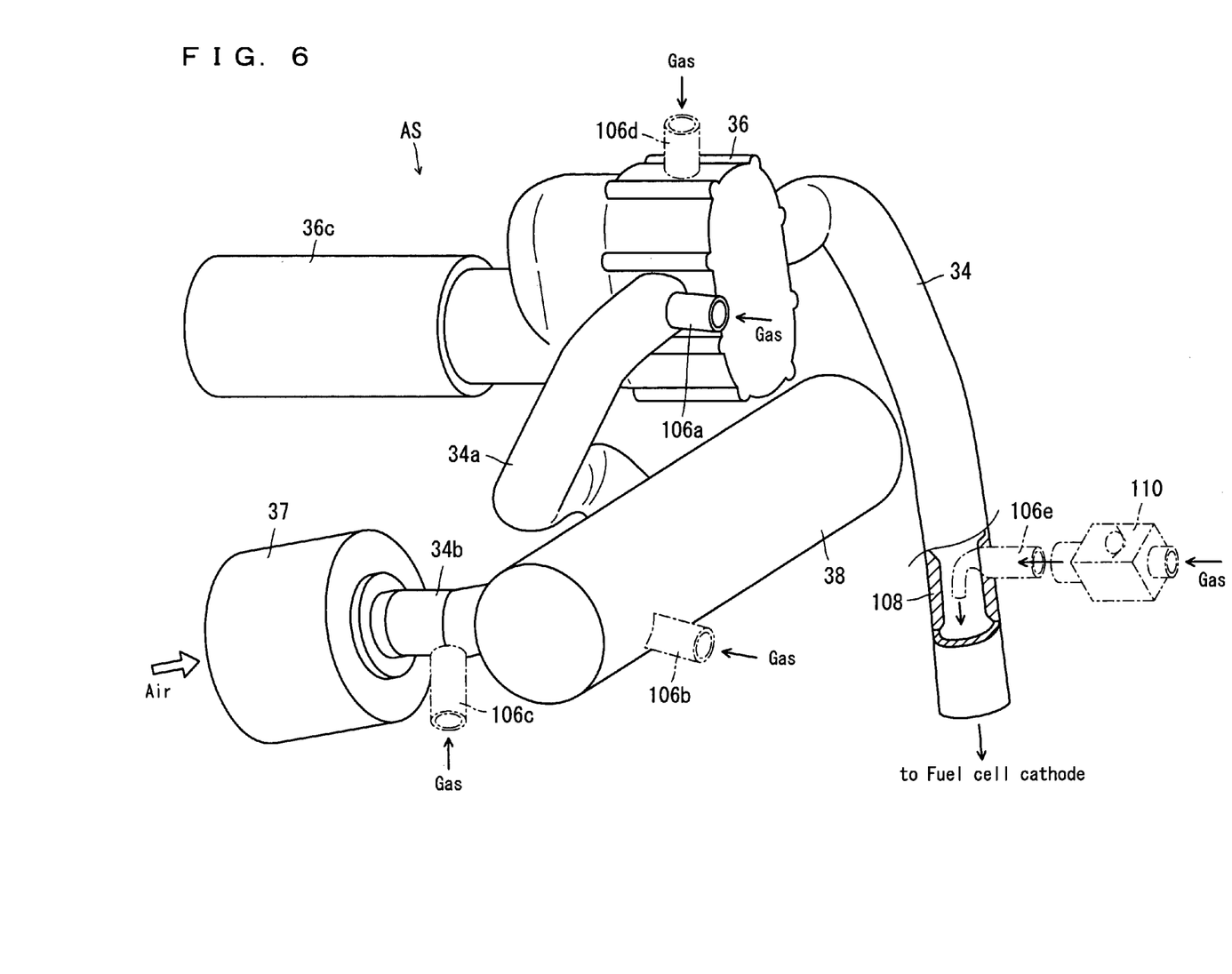
FIG. 6 is a schematic diagram showing an example of an air supplying unit.
Figure 7:
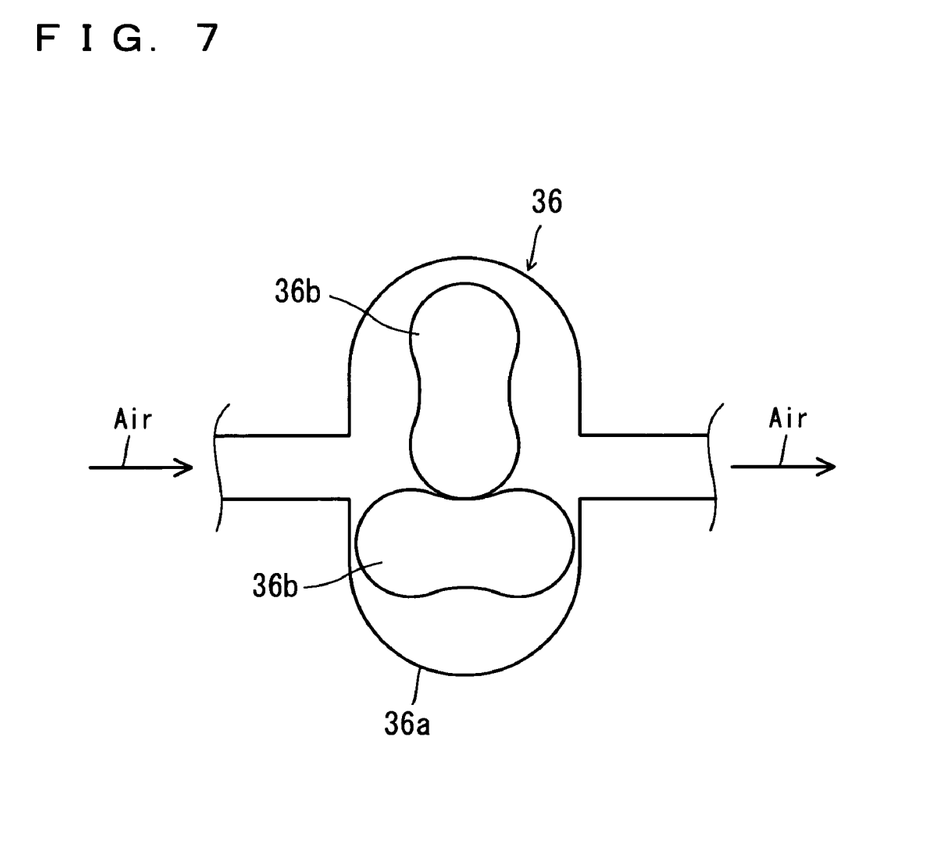
FIG. 7 is a schematic diagram showing an example of air pump.

Referring to FIG. 6, the air supplying unit AS preferably includes an air pump 36. The air pump 36 is provided by, e.g., a root blower pump as shown in FIG. 7. In this case, the air pump 36 includes a pump case 36a and two generally cocoon-shaped rotors 36b housed in the pump case 36a. The two rotors 36b are driven by a motor 36c, and rotated while engaging with each other. The air pump 36 has its suction side connected with an air chamber 38 via a pipe 34a. The air chamber 38 has its suction side connected with an air filter 37 via a pipe 34b. Thus, the filter 37 is disposed at the end of the suction side. On the other hand, the air pump 36 has its air-intake side connected with the cathode 12c of the fuel cell 12 via an air-intake pipe 34.

Figure 8:
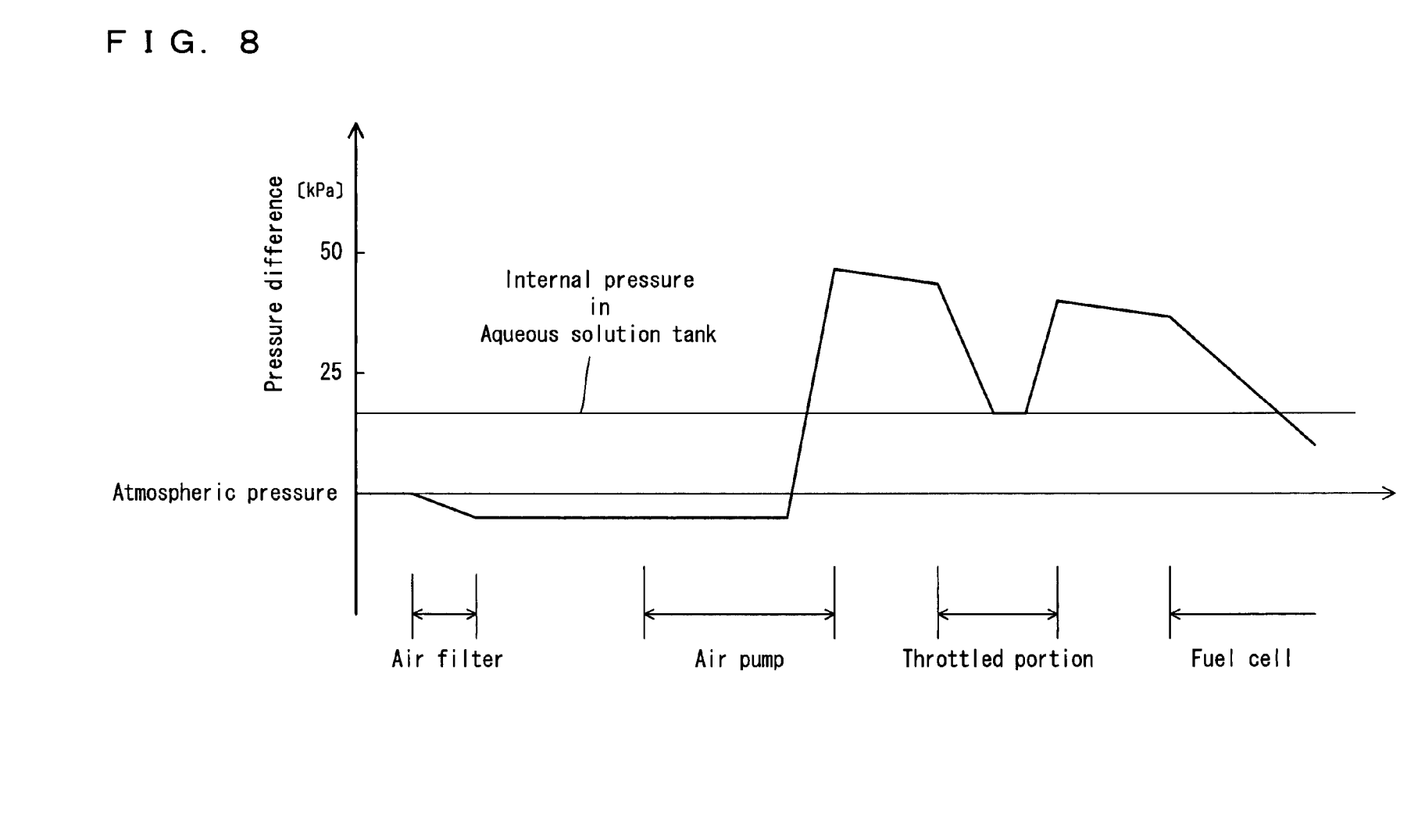
FIG. 8 is a graph which shows a pressure difference from the atmospheric pressure, of a gas supplied to a cathode of the fuel cell, at different locations in the system.

In the air supplying unit AS, the motor 36c drives the air pump 36, thereby sucking air from the outside and supplying it to the cathode 12c of the fuel cell 12. The gas which is supplied to the cathode 12c of the fuel cell 12 has different pressures at various locations in the system. FIG. 8 shows the difference (pressure difference) in pressure of the gas from the atmosphere at each component.

Attention should be paid here to the fact that the gas in the aqueous solution tank 18 is introduced to the cathode 12c of the fuel cell 12 via the pipe 42.

In this preferred embodiment, the pipe 34a on the suction side of the air pump 36 has a merging connector 106a, and the connector 106a is fitted by the pipe 42. Thus, the gas, which contains gasified fuel, from the aqueous solution tank 18 is introduced by the pipe 42 to the suction side of the air pump 36, and without adding pressure, the gas is sucked and pressurized by the air pump 36, and then sent to the cathode 12c of the fuel cell 12 together with the air from the outside. The cathode 12c is preferably provided with a platinum catalyst which oxidizes/burns the methanol, so very little methanol is discharged out of the system. During this process, it is anticipated that relative volume of oxygen in the air supplied to the cathode 12c is decreased, yet the rate is only within around 1%, which will not lead to a virtual reduction in the power generation efficiency.

It should be noted that the place where the pipe 42 is connected is not limited by the above-described preferred embodiment. For example, the pipe 42 may be connected as described in the following paragraph.

Specifically, as shown in FIG. 6, the air chamber 38 may have a merging connector 106b, so that the connector 106b is fitted by the pipe 42. Since the pressure in the air chamber 38 is brought to a reduced pressure as the air pump 36 operates, the gas from the aqueous solution tank 18 is drawn into the air chamber 38 and the gas is reliably supplied to the cathode 12c, without relying upon a check valve or other reverse-flow prevention device. The carbon dioxide in the aqueous solution tank 18 can also be discharged easily.

Another alternative may be that a merging connector 106c is provided in the pipe 34b between the air chamber 38 and the air filter 37, and the connector 106c is fitted by the pipe 42. In this case again, the pressure in the pipe 34b is brought to a partial vacuum as the air pump 36 operates, and so the gas from the aqueous solution tank 18 can be introduced into the cathode 12c without relying upon a check valve, etc.

Still another alternative is that the air pump 36 is provided with a merging connector 106d, and the connector 106d is fitted by the pipe 42, so that the gas from the aqueous solution tank 18 can be introduced to a portion of the air pump 36 where the pressure is lower than in the aqueous solution tank 18. In this case, the gas is sent easily to the cathode 12c of the fuel cell 12, without flowing back. The merging connector 106d may be provided with a check valve, to which the pipe 42 is connected. In this case, back flow of the gas is prevented more reliably.

As still another alternative, on the discharge side of the air pump 36, the air-intake pipe 34 has a part provided with a throttled portion 108 which makes a narrower passage (has a smaller area of section) than the other parts. The throttled portion 108 is formed with a merging connector 106e and the connector 106e is fitted by the pipe 42. In this case, methanol which is detrimental to the pump mechanism is supplied to the discharge side (downstream side) of the air pump 36, so there is no possible damage to the air pump 36. Another advantage is that the gas velocity increases at the throttled portion 108 and there is a relative decrease in the pressure there. Thus, introducing the gas from the aqueous solution tank 18 to this particular portion enables easy discharge of carbon dioxide from the aqueous solution tank 18.

An additional alternative is that the merging connector 106e attached to the throttled portion 108 is connected with the pipe 42 via a check valve 110. In this case, it becomes possible to prevent air from flowing back toward the aqueous solution tank 18.

In the examples described above, the pipe 42, the connectors 106a through 106e and the check valve 110 serve as elements for defining the gas guide.

The present invention is effective in direct methanol fuel cell systems which are most efficiently operated at temperature not lower than about 50° C., where there is a large amount of methanol evaporation. The present invention is particularly advantageous for motorcycles in which operation temperatures are relatively high.

The fuel cell system 10 can be suitably used not only in motorcycles but also in any transport equipment including automobile, boats and ships, and other suitable vehicles.

The present invention is also applicable to small-scale, stationary-type fuel cell systems.

It should be noted that the tubular member may not necessarily be a pipe, but may be any other suitable element as long as it is able to introduce gas containing gasified methanol.

The fuel to be used is not limited to methanol, and may be any other type of alcohol fuel such as ethanol.

The present invention being thus far described and illustrated in detail, it is noted that these description and drawings only exemplify the present invention, and should not be interpreted as limiting the present invention. The spirit and scope of the present invention is only limited by words used in the accompanied claims.

What is claimed is:

1. A fuel cell system comprising:
   an aqueous solution tank which holds fuel aqueous solution;
   a fuel cell including an anode supplied with the fuel aqueous solution from the aqueous solution tank, and a cathode provided with a catalyst;
   an aqueous solution pipe connected to the aqueous solution tank and arranged to withdraw the fuel aqueous solution as a fluid from the aqueous solution tank and to supply the fuel aqueous solution to the anode;
   a pipe connected to the anode and arranged to supply gasified fuel aqueous solution and carbon dioxide from the anode to the aqueous solution tank;
   an air supplying unit including an air pump and arranged to supply air to the cathode in the fuel cell; and
   a gas guide arranged to withdraw a gas including the gasified fuel aqueous solution and the carbon dioxide from the aqueous solution tank and to add the gas including the gasified fuel aqueous solution and the carbon dioxide to the air to be sent to the cathode; wherein
   the gas guide extends from the aqueous solution tank toward the cathode without first reaching the anode.

2. The fuel cell system according to claim 1, wherein the gas guide includes a tubular member arranged to guide the gas to a suction side of the air pump of the air supplying unit.

3. The fuel cell system according to claim 2, wherein the air supplying unit includes an air filter provided at an end of the suction side, and an air chamber provided between the air filter and the air pump and connected with the tubular member.

4. The fuel cell system according to claim 1, wherein the gas guide includes a tubular member arranged to guide the gas to a discharge side of the air pump of the air supplying unit.

5. The fuel cell system according to claim 4, wherein the gas guide further includes a check valve connected with the tubular member and arranged to prevent the gas from flowing back.

6. The fuel cell system according to claim 4, wherein the air supplying unit includes a pipe which connects the air pump with the cathode of the fuel cell, the pipe being provided with a throttled portion for reduced cross section of a passage for the gas, and the gas guide is arranged to add the gas to the air at the throttled portion.

7. The fuel cell system according to claim 1, wherein the gas guide includes a tubular member arranged to guide the gas to a space in the air pump, the space having a pressure lower than a pressure in the aqueous solution tank.

8. The fuel cell system according to claim 1, wherein the fuel cell is operated at a temperature that is not lower than about 50° C.

9. The fuel cell system according to claim 1, wherein the fuel cell system is one of a direct methanol fuel cell system and a direct ethanol fuel cell system.

10. The fuel cell system according to claim 1, wherein the fuel cell includes a plurality of direct methanol fuel cells connected in series and each including an electrolyte, the anode and the cathode.

11. The fuel cell system according to claim 1, wherein the anode and the cathode provide fields for a chemical reaction expressed by:

Reaction at Anode: $CH_3OH+H_2O \rightarrow 6H^++CO_2+6e^-$

Reaction at Cathode: $3/2O_2+6H^++6e^- \rightarrow 3H_2O$.

12. The fuel cell system according to claim 1, wherein the air supplying unit includes an air-intake pipe, the air pump arranged to pump oxygen-containing air from outside and send the air to the cathode in the fuel cell, an air filter which purifies the air introduced from the outside by the air pump, and an air chamber which reduces noise from the air pump.

13. The fuel cell system according to claim 1, wherein the air pump includes a pump case and two generally cocoon-shaped rotors housed in the pump case.

14. The fuel cell system according to claim 12, wherein the air pump has a pipe on a suction side thereof arranged to connect the air pump to the air chamber, and the air-intake pipe connects the air pump to the cathode of the fuel cell.

15. The fuel cell system according to claim 14, wherein the pipe on the suction side of the air pump has a merging connector fitted to a pipe that connects the air supplying unit with the aqueous solution tank.

16. The fuel cell system according to claim 12, wherein a pipe is provided between the air chamber and the air filter, and a merger connector is provided on the pipe provided between the air chamber and the air filter, and the merger connector is fitted to a pipe that connects the air supplying unit with the aqueous solution tank.

17. The fuel cell system according to claim 12, wherein the air pump includes a merger connector that is fitted to a pipe that connects the air supplying unit with the aqueous solution tank.

18. The fuel cell system according to claim 6, wherein the pipe includes a check valve arranged to connect the pipe to a pipe that connects the air supplying unit with the aqueous solution tank.

19. Transport equipment including the fuel cell system according to claim 1.

20. A two-wheeled vehicle including the fuel cell system according to claim 1.

* * * * *